(12) United States Patent
Rehn

(10) Patent No.: US 10,878,850 B2
(45) Date of Patent: Dec. 29, 2020

(54) METHOD AND APPARATUS FOR VISUALIZING INFORMATION OF A DIGITAL VIDEO STREAM

(71) Applicant: Axis AB, Lund (SE)

(72) Inventor: John Rehn, Malmo (SE)

(73) Assignee: Axis AB, Lund (SE)

( * ) Notice: Subject to any disclaimer, the term of this patent is extended or adjusted under 35 U.S.C. 154(b) by 396 days.

(21) Appl. No.: 14/944,922

(22) Filed: Nov. 18, 2015

(65) Prior Publication Data

US 2016/0148649 A1 May 26, 2016

(30) Foreign Application Priority Data

Nov. 20, 2014 (EP) .................................... 14194035

(51) Int. Cl.
| | | |
|---|---|---|
| G11B 27/034 | (2006.01) | |
| G11B 27/28 | (2006.01) | |
| G11B 33/10 | (2006.01) | |
| H04N 7/18 | (2006.01) | |
| G11B 27/00 | (2006.01) | |
| G11B 31/00 | (2006.01) | |

(52) U.S. Cl.
CPC .......... *G11B 27/034* (2013.01); *G11B 27/005* (2013.01); *G11B 27/28* (2013.01); *G11B 31/006* (2013.01); *G11B 33/10* (2013.01); *H04N 7/183* (2013.01)

(58) Field of Classification Search
CPC .... G11B 27/34; G11B 31/006; H04N 5/4401; H04N 7/54; H04N 7/183
USPC .......................................... 386/278; 348/714
See application file for complete search history.

(56) References Cited

U.S. PATENT DOCUMENTS

| | | |
|---|---|---|
| 2002/0144262 A1 | 10/2002 | Plotnick et al. |
| 2003/0021930 A1 | 1/2003 | Mientus et al. |
| 2004/0150657 A1 | 8/2004 | Wittenburg et al. |
| 2006/0256210 A1 | 11/2006 | Ryall et al. |
| 2008/0199156 A1 | 8/2008 | Uchiike et al. |
| 2010/0169330 A1 | 7/2010 | Albers et al. |
| 2010/0208142 A1* | 8/2010 | He .......................... H04N 5/20 348/671 |
| 2010/0232768 A1 | 9/2010 | Nakamura et al. |
| 2012/0210232 A1 | 8/2012 | Wang et al. |

(Continued)

FOREIGN PATENT DOCUMENTS

| | | | |
|---|---|---|---|
| AU | 2009243430 A1 * | 6/2011 | ............... H04N 7/18 |
| CN | 1989545 A | 6/2007 | |

(Continued)

OTHER PUBLICATIONS

EP 14 19 4035.3 European Search Report (dated May 21, 2015).

*Primary Examiner* — Thai Q Tran
*Assistant Examiner* — Jose M Mesa
(74) *Attorney, Agent, or Firm* — Volpe Koenig

(57) ABSTRACT

The present invention relates to a method and apparatus for visualizing information of a digital video stream is disclosed. The apparatus comprises: a memory arranged to store a series of merged image frames which is formed by merging groups of image frames of the digital video stream; a blending module arranged to blend multiple merged frames into a series of blended image frames, wherein each of a plurality of the merged image frames contributes to a plurality of the blended image frames; and a display arranged to display the series of blended image frames.

11 Claims, 1 Drawing Sheet

(56) References Cited

U.S. PATENT DOCUMENTS

2013/0044260 A1    2/2013   Vestergaard et al.
2013/0163961 A1    6/2013   Wu et al.

FOREIGN PATENT DOCUMENTS

| | | |
|---|---|---|
| CN | 101366027 A | 2/2009 |
| CN | 103891303 A | 6/2014 |
| JP | 2000-187478 A | 7/2000 |
| JP | 2002-094947 A | 3/2002 |
| JP | 2005-210573 A | 8/2005 |
| JP | 2007-036680 A | 2/2007 |
| JP | 2008-205693 A | 9/2008 |
| JP | 2011-151429 A1 | 8/2011 |
| JP | 2012134700 A | 7/2012 |
| JP | 2013-066020 A1 | 4/2013 |
| KR | 10-2007-0019000 A | 8/2008 |
| WO | 2001/78050 A2 | 10/2001 |
| WO | 2005/111989 A2 | 11/2005 |
| WO | 2007057893 A2 | 5/2007 |
| WO | 2013/065242 A1 | 10/2012 |

\* cited by examiner

METHOD AND APPARATUS FOR VISUALIZING INFORMATION OF A DIGITAL VIDEO STREAM

FIELD OF INVENTION

The present invention relates to visualizing information of a digital video stream, especially fast forward playback of the digital video stream.

BACKGROUND

Video cameras are often used for monitoring areas. The resulting video data in form of one or more digital video steams is viewed live or stored in data-bases and checked off-line. In order to search through the stored video data looking for events occurring in the digital video steam manual search through the digital video stream using fast forward playback is often used. Fast forward payback of digital recorded video does however consume lots of processing resources and it might be hard to spot the event if it is only occurring for a short period of time.

SUMMARY

In view of the above, it is an object of the present invention to provide a method and apparatus for visualizing information of a digital video stream, wherein the disadvantages of the aforementioned prior art are substantially reduced.

According to a first aspect of the invention, the above object is achieved by a method for visualizing information of a digital video stream. The method comprising receiving a series of merged image frames which is formed by merging groups of image frames of the digital video stream; blending multiple merged frames into a series of blended image frames, wherein each of a plurality of the merged image frames contributes to a plurality of the blended image frames; displaying, on a display, the series of blended image frames.

By forming the series of blended image frames according to the above each of a plurality of the merged image frames contributes to a plurality of the blended image frames, this will produce a series of blended image frames wherein information from each of a plurality of the original image frames will contribute to a plurality of the blended image frames. This will result in that information from an original frame will be present in a plurality of the blended image frames. Hence, if information of interest is present in only one (or a few) original images frames this information of interest will be present in a plurality (being larger than the few) of the blended image frames. That is, when the series of blended image frames are being played back the playback will both be a fast forward playback and the information of interest will be present throughout a larger number of blended images than for the original frames. Information of interest in the original image frames of the video stream will be present as "a ghost" throughout a larger number of blended image frames compared with the number of images frame wherein the information of interest originally where present.

The method may further comprise setting number of image frames contributing to each merged frame.

The method may further comprise setting number of merged image frames contributing to each blended image frame.

A merged image frame contributing weight may be set to change between at least two of the blended image frames to which the merged image frame contributes.

Alternatively, the merged image frame contributing weight may be set to be constant for each of the blended image frames to which the merged image frame contributes.

The displaying of the series of blended image frames may be performed by displaying the blended image frames consecutively as a video stream of blended image frames.

Alternatively or in combination, the displaying of the series of blended image frames may performed by displaying the blended image frames side by side on the display.

The method may further comprise merging groups of image frames of the digital video stream into the series of merged image frames.

The method may further comprise reducing the resolution of the image frames before merging groups of image frames from the video stream into the series of merged image frames.

Alternatively, the method may further comprising reducing the resolution of the image frames upon merging groups of image frames from the video stream into the series of merged image frames.

The method may further comprise detecting an event of interest in the digital video stream and setting an image frame contributing weight for an image frame of the digital video stream comprising the event differently than an image frame contributing weight for an image frame of the digital video stream not comprising the event.

The method may further comprise detecting an event of interest in the digital video stream and setting a merged image frame contributing weight for a merged image frame comprising the event differently than a merged image frame contributing weight for a merged image frame not comprising the event.

According to a second aspect of the invention, the above object is achieved by an apparatus method for visualizing information of a digital video stream. The apparatus comprising: a memory arranged to store a series of merged image frames which is formed by merging groups of image frames of the digital video stream; a blending module arranged to blend multiple merged frames into a series of blended image frames, wherein each of a plurality of the merged image frames contributes to a plurality of the blended image frames; and a display arranged to display the series of blended image frames.

The apparatus may further comprise a merging module arranged to merge groups of image frames from the digital video stream into the series of merged image frames.

The above mentioned features of the method, when applicable, apply to this second aspect as well. In order to avoid undue repetition, reference is made to the above.

It is noted that the invention relates to all possible combinations of features recited in the claims.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION OF THE PREFERRED EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
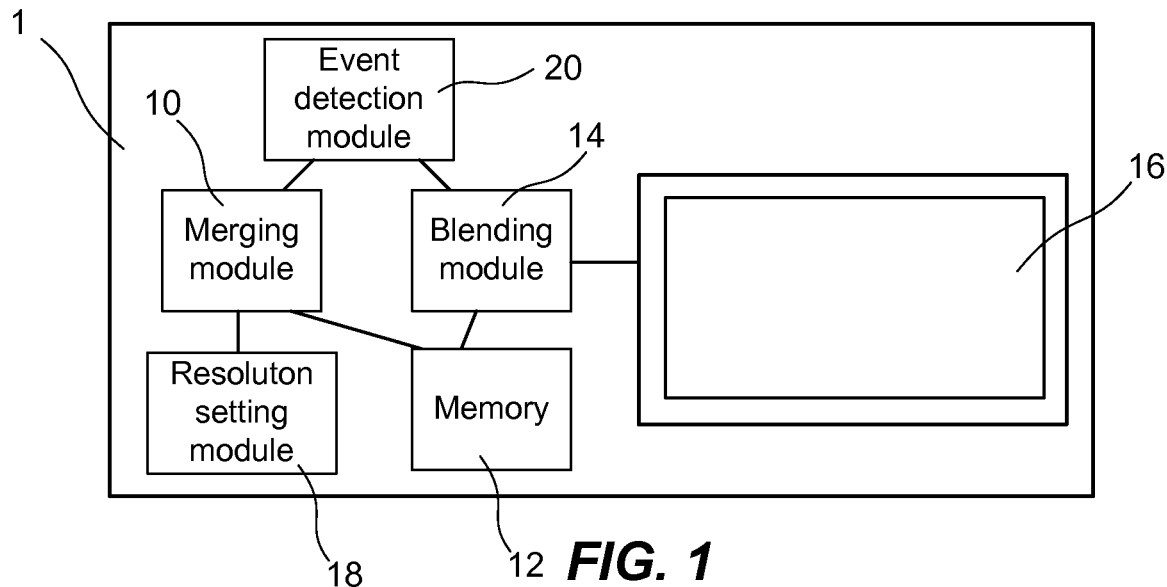
FIG. 1 is schematic view of an apparatus for visualizing information of a digital video stream.

FIG. 1 illustrates an apparatus 1 for visualizing information of a digital video stream. Especially for fast forward playback of a digital video stream. The apparatus 1 comprises a merging module 10, a memory 12, a blending module 14 and a display 16.

The apparatus 1 is arranged to produce or receive video data pertaining to the digital video stream. In case the apparatus 1 is arranged to produce video data pertaining to the digital video stream the apparatus 1 comprises an image recording module (not shown). The image recording module may e.g. be a module comprising an image sensor and an image processor arranged to process image data captured by the image sensor. In case the apparatus 1 is arranged to receive video data pertaining to the digital video stream the apparatus 1 comprises an input port (not shown) via which the video data pertaining to the digital video stream is received. The input port may be a digital network port or any other port being suitable for receiving the video data pertaining to the digital video stream. Alternatively, the input port may be a memory port arranged to receive an exchangeable memory such as a USB memory stick or the like.

The merging module 10 is arranged to merge groups of image frames from the digital video stream into a series of merged image frames. This may be visualized by the following example. Consider a digital video stream comprising the following image frames:

A B C D E F G H I J K L M N O P Q R S T U V W X

The merging module 10 may then be arranged to produce a series of merged image frames, MF, according to the following:

$MF_1 = \tfrac{1}{3} A + \tfrac{1}{3} B + \tfrac{1}{3} C$
$MF^2 = \tfrac{1}{3} D + \tfrac{1}{3} E + \tfrac{1}{3} F$
$MF_3 = \tfrac{1}{3} G + \tfrac{1}{3} H + \tfrac{1}{3} I$
$MF_4 = \tfrac{1}{3} J + \tfrac{1}{3} K + \tfrac{1}{3} L$
$MF_5 = \tfrac{1}{3} M + \tfrac{1}{3} N + \tfrac{1}{3} O$
$MF_6 = \tfrac{1}{3} P + \tfrac{1}{3} Q + \tfrac{1}{3} R$
$MF_7 = \tfrac{1}{3} S + \tfrac{1}{3} T + \tfrac{1}{3} U$
$MF_8 = \tfrac{1}{3} V + \tfrac{1}{3} W + \tfrac{1}{3} X$ According to this example each merged image frame comprises image data from three different original image frames of the digital video stream. However, it shall be understood that other possibilities are also feasible as long as the series of merged image frames is formed by merging groups of image frames of the digital video stream. The series of merged image frames is formed such that the number of merged image frame is less than the number of original image frames. This may for example be made by merging the groups of original image frames such that each original image frame only contribute to a single merged image frame. Upon playback of the series of merged image frames using the same or a similar frame rate as for the digital video stream a fast forward playback of the digital video stream is achieved. This occurs or happens since the number of image frames in the series of merged image frames is reduced as compared to the number of images frames of the digital video stream. The merging module 10 may be arranged so that number of image frames contributing to each merged frame may be set. Number of image frames contributing to each merged frame may be set by a user of the apparatus 1 by interaction by, for example, a keyboard, a mouse, a trackball, a microphone, or any other suitable input unit being connected to the apparatus 1. The number of image frames contributing to each merged image frame may be set to be the same for each merged image frame. Alternatively, the number of image frames contributing to each merged image frame may be set to differ between the merged image frames. The number of image frames contributing to each merged image frame may be set to vary dynamically between the merged image frames. This dynamical change in the number of image frames contributing to each merged image frame may e.g. be controlled by the level of motion in the scene or being triggered by a specific type of event occurring in the scene. In case of a high level of motion in the scene the number of image frames contributing to each merged image frame is set to be low, and in case of a low level of motion in the scene number of image frames contributing to each merged image frame is set to be higher; or vice versa. By changing the number of image frames contributing to each merged image frame the frame rate of the merged frames may be not constant. The not constant frame rate of the merged frames may be compensated for when performing the blending discussed below. Alternatively, the not constant frame rate of the merged frames may not be compensated for and hence the play back speed of the resulting series of blended image frames may vary.

The image data of the original image frames of the digital video stream may be added using various merging schemes, such as Alpha compositing, multiply blend and screen blend. The person skilled in the art also realizes that other merging schemes are also possible to use.

An image frame contributing weight for the contribution from the different image frames to each merged image frame may also be set in the merging module 10. The image frame contributing weight may be set by a user of the apparatus 1 by interaction by, for example, a keyboard, a mouse, a trackball, a microphone, or any other suitable input unit being connected to the apparatus 1. The image frame contributing weight may, as in the example above, be set to be equal for all image frames contributing to a specific merged image frame. Alternatively, the image frame contributing weight may be set to be different for the image frames contributing to a specific merged image frame. The image frame contributing weight may vary dynamically between the merged image frames. This dynamical change of the image frame contributing weight may e.g. be controlled by detecting an event occurring in the image frames. An image frame might get a higher image frame contributing weight if it is considered more interesting for some reason. Image frames being considered more interesting may be found by video analytics used for finding events of interest in the digital video stream. For example, a face detection algorithm could for example indicate one or more image frames where a face is more visible than in others. Other kind of video analytics may also be used in order to find events of interest in the digital video stream.

The memory 12 is arranged to receive and store the series of merged image frames. The memory 12 may be any kind of volatile or non-volatile memory suitable for storing digital data. The series of merged image frames is digital data.

The blending module 14 is arranged to blend multiple merged frames of the series of merged image frames into a series of blended image frames, BF, wherein each of a plurality of the merged image frames contributes to a plurality of the blended image frames. Hence, the series of blended image frames is formed by blending groups of merged image frames. This may be visualized by the following example:

$BF_1 = \frac{1}{3} MF1 + \frac{1}{3} MF2 + \frac{1}{3} MF3$
$BF_2 = \frac{1}{3} MF2 + \frac{1}{3} MF3 + \frac{1}{3} MF4$
$BF_3 = \frac{1}{3} MF3 + \frac{1}{3} MF4 + \frac{1}{3} MF5$
$BF_4 = \frac{1}{3} MF4 + \frac{1}{3} MF5 + \frac{1}{3} MF6$
$BF_5 = \frac{1}{3} MF5 + \frac{1}{3} MF6 + \frac{1}{3} MF7$
$BF_6 = \frac{1}{3} MF6 + \frac{1}{3} MF7 + \frac{1}{3} MF8$ According to this example each blended image frame comprises image data from three different merged image frames of the series of merged image frames. However, it shall be understood that other possibilities are also feasible as long as the series of blended image frames is formed by blending groups of merged image frames of the series of merged image frames. Moreover, at least some of the merged image frames of the series of merged image frames contribute to more than one blended image frame. Accordingly, each of a plurality of the merged image frames contributes to a plurality of the blended image frames. Depending on how the merged image frames are blended into the series of blended image frames the number of blended image frames in the series of blended image frames may be reduced as compared to the number of merged images frames of the series of merged image frames. Hence, upon playback of the series of blended image frames an enhanced playback speed of the digital video stream may be achieved as compared with the playback of the series of merged image frames.

The blending module 14 may be arranged so that number of merged image frames contributing to each blended image frame may be set. Number of merged image frames contributing to each blended image frame may be set by a user of the apparatus 1 by interaction by, for example, a keyboard, a mouse, a trackball, a microphone, or any other suitable input unit being connected to the apparatus 1. The number of merged image frames contributing to each blended images frame may be set to be the same for each blended image frame. Alternatively, the number of merged image frames contributing to each blended image frame may be set to differ between the blended image frames. The number of merged image frames contributing to each blended image frame may be set to vary dynamically between the blended image frames. The number of merged image frames contributing to each blended image frame may be controlled in order to compensate for the change of frame rate arising from having a dynamically set number of image frames contributing to the merged image frames. The number of merged image frames contributing to each blended image frame may also, or in combination, be increased to include a merged image frame comprising an event of particular interest in more blended image frames. Merged image frames comprising an event of particular interest may be found by video analytics used for finding events of interest in the digital video stream. For example, a face detection algorithm could for example indicate one or more image frames where a face is more visible than in others. Other kind of video analytics may also be used in order to find events of interest in the digital video stream.

The image data of the merged image frames of the series of merged image frames may be added using various blending schemes, such as Alpha compositing, multiply blend and screen blend. The person skilled in the art also realizes that other blending schemes are also possible to use.

A merged image frame contributing weight for the contribution from the different merged image frames to each blended image frame may also be set in the blending module 14. The merged image frame contributing may be set by a user of the apparatus 1 by interaction by, for example, a keyboard, a mouse, a trackball, a microphone, or any other suitable input unit being connected to the apparatus 1. The merged image frame contributing weight may, as in the example above, be set to be equal for all merged image frames contributing to a specific blended image frame. Alternatively, the merged image frame contributing weight may be set to be different for the merged image frames contributing to a specific blended image frame. This is illustrated in the following example:

$BF'_4 = \frac{1}{4} MF1 + \frac{1}{2} MF2 + \frac{1}{4} MF3$
$BF'_2 = \frac{1}{4} MF2 + \frac{1}{2} MF3 + \frac{1}{4} MF4$
$BF'_3 = \frac{1}{4} MF3 + \frac{1}{2} MF4 + \frac{1}{4} MF5$
$BF'_4 = \frac{1}{4} MF4 + \frac{1}{2} MF5 + \frac{1}{4} MF6$
$BF'_5 = \frac{1}{4} MF5 + \frac{1}{2} MF6 + \frac{1}{4} MF7$
$BF'_6 = \frac{1}{4} MF6 + \frac{1}{2} MF7 + \frac{1}{4} MF8$ In the above example the merged image frame are blended into the blended image frames in a fading manner. That is, the contribution of a merged image frame is faded in and/or out of the series of blended image frames.

Alternatively or in combination, the merged image frame contributing weight may be set to vary dynamically between the blended image frames. Merged image frames marked as being of interest may have a higher merged image frame contributing weight than non-marked merged image frames. The marking of the merged image frames may be triggered by video analytics events finding events of interest in the digital video stream.

The display 16 is arranged to display the series of blended image frames. The displaying of the series of blended image frames may be performed by displaying the blended image frames consecutively as a video stream of blended image frames. Alternatively, the displaying of the series of blended image frames may be performed by displaying the blended image frames side by side on the display.

The apparatus 1 may also comprise a resolution setting module 18. The resolution setting module 18 may be arranged to set the resolution of the image frames of the digital video stream. The resolution setting module 18 may be arranged to reduce the resolution of at least some of the image frames before the merging module 10 is arranged to merge groups of image frames from the video stream into the series of merged image frames. Alternatively, the resolution setting module 18 and the merging module 10 may be arranged to cooperate so that the resolution of the image frames is reduced upon merging groups of image frames from the video stream into the series of merged image frames. The apparatus 1 may also comprise an event detection module 20. The event detection module 20 is arranged to detect event(s) within the digital video stream containing information of interest. The event may be an object moving within the scene depicted by the digital video stream, e.g. a person, car, animal or another object moving within the scene. Alternatively or in combination, the event may be an object of a specific type being present in the scene depicted by the digital video stream, e.g. a face of a person, a license plate of a car or another object of a specific type being present in the scene.

The information pertaining to the detected event(s) may be used for controlling the image frame contributing weight and/or the merged image frame contributing weight discussed above. Original images frames and/or merged image frames comprising event(s) detected by the event detection module 20 are given higher weights that original images frames and/or merged image frames not comprising event(s) detected by the event detection module 20.

Moreover, the information pertaining to the detected event(s) within the digital video stream may be used by the merging module 10 in order to weight areas of the original image frames comprising the detected event(s) differently than the areas of the original image frame pertaining to a background of the scene. Alternatively or in combination, the information pertaining to the detected event(s) within the digital video stream may be used by the blending module 14 in order to weight areas of the merged image frames comprising the detected event(s) differently than the areas of the merged image frame pertaining to the background of the scene. The background of the scene may be the areas of the original image frames and/or merged image frames not comprising the detected event(s).

The merging module 10, the blending module 14, the image resolution setting module 18 and/or the event detection module 20 of the apparatus 1 may be implemented as software code run by a processing unit, as hardware implemented in the apparatus 1 or as a combination thereof. The apparatus 1 may also comprise an additional memory (not shown). The merging module 10, the blending module 14 and/or the image resolution setting module 18 may be arranged to store and/or retrieve data from/on the additional memory. The additional memory may be any kind of volatile or non-volatile memory suitable for storing digital data.

Figure 2:
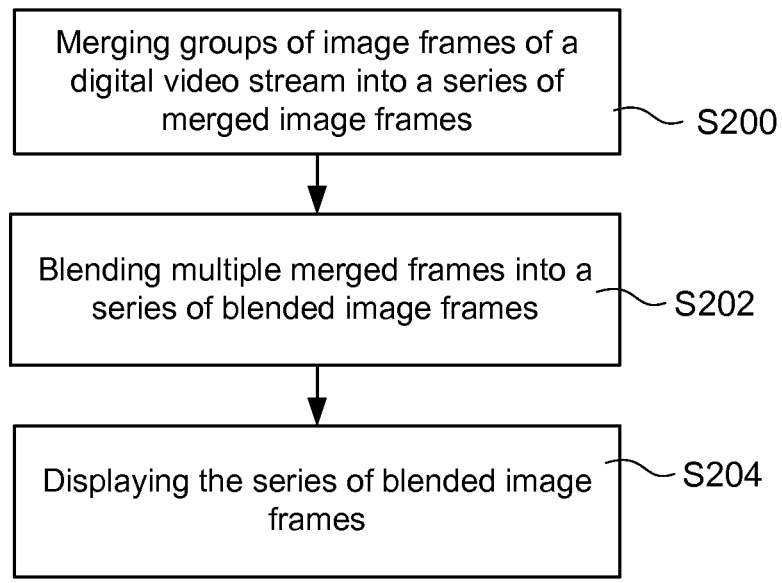
FIG. 2 is a block diagram of a method for visualizing information of a digital video stream.

In FIG. 2 a block diagram of a method for visualizing information of a digital video stream. The method comprises: merging (S200) groups of image frames of the digital video stream into the series of merged image frames; blending (S202) multiple merged frames into a series of blended image frames, wherein each of a plurality of the merged image frames contributes to a plurality of the blended image frames; and displaying (S204) the series of blended image frames.

The person skilled in the art realizes that the present invention by no means is limited to the preferred embodiments described above. On the contrary, many modifications and variations are possible within the scope of the appended claims.

For example, the apparatus 1 may instead of comprising the merging module 10 be arranged to receive a series of merged frames from another apparatus. This other apparatus may e.g. be a digital video camera comprising a merging module arranged according to the merging module as discussed above in connection with FIG. 1.

The display 16 of the apparatus 1 may form an integral part of the apparatus 1 as shown in FIG. 1. However, the display may also be part of a peripheral device being connected to a processing device comprising the blending module, the memory and/or the merging module, the processing device and the peripheral device forming the apparatus 1.

Additionally, variations to the disclosed embodiments can be understood and effected by the skilled person in practicing the claimed invention, from a study of the drawings, the disclosure, and the appended claims.

What is claimed is:

1. A method for visualizing information of a digital video stream, the method comprising:
   merging groups of original image frames of the digital video stream into a series of merged image frames, wherein each merged image frame is generated from a different group of original image frames, and wherein each group of original frames includes no frames of any other group of original frames;
   storing the series of merged image frames;
   blending multiple series of merged image frames into a series of blended image frames, wherein each of the merged image frames contributes to a plurality of the blended image frames, and wherein a merged image frame contributing weight is set to be constant for each of the blended image frames to which the merged image frame contributes; and
   displaying, on a display, the series of blended image frames.

2. The method according to claim 1, further comprising setting number of image frames contributing to each merged frame.

3. The method according to claim 1, further comprising setting number of merged image frames contributing to each blended image frame.

4. The method according to claim 1, wherein the displaying of the series of blended image frames is performed by displaying the blended image frames consecutively as a video stream of blended image frames.

5. The method according to claim 1, wherein the displaying of the series of blended image frames is performed by displaying the blended image frames side by side on the display.

6. The method according to claim 1, further comprising reducing the resolution of the image frames before merging groups of image frames from the video stream into the series of merged image frames.

7. The method according to claim 1, further comprising reducing the resolution of the image frames upon merging groups of image frames from the video stream into the series of merged image frames.

8. The method according to claim 1, further comprising detecting an event of interest in the digital video stream and setting an image frame contributing weight for an image frame of the digital video stream comprising the event differently than an image frame contributing weight for an image frame of the digital video stream not comprising the event.

9. The method according to claim 1, further comprising detecting an event of interest in the digital video stream and setting a merged image frame contributing weight for a merged image frame comprising the event differently than a merged image frame contributing weight for a merged image frame not comprising the event.

10. An apparatus for visualizing information of a digital video stream, the apparatus comprising:
- a merging module implemented as software code run by a processing unit or dedicated hardware, wherein the merging module is arranged to merge groups of original image frames from the digital video stream into a series of merged image frames, wherein each merged image frame is generated from a different group of original image frames, and wherein each group of original frames includes no frames of any other group of original frames;
- a memory arranged to store the series of merged image frames;
- a blending module implemented as software code run by a processing unit or dedicated hardware, wherein the blending module is arranged to blend multiple series of merged image frames into a series of blended image frames, wherein each of the merged image frames contributes to a plurality of the blended image frames, and wherein a merged image frame contributing weight is set to be constant for each of the blended image frames to which the merged image frame contributes; and
- a display arranged to display the series of blended image frames.

11. A non-transitory computer readable recording medium configured to store a set of instructions that, when executed on a device having processor capabilities, cause the device to perform a method for visualizing information of a digital video stream, the method comprising:
- merging groups of original image frames of the digital video stream into a series of merged image frames, wherein each merged image frame is generated from a different group of original image frames, and wherein each group of original frames includes no frames of any other group of original frames;
- storing the series of merged image frames;
- blending multiple series of merged image frames into a series of blended image frames, wherein each of the merged image frames contributes to a plurality of the blended image frames, and wherein a merged image frame contributing weight is set to be constant for each of the blended image frames to which the merged image frame contributes; and
- displaying, on a display, the series of blended image frames.

* * * * *